United States Patent [19]

Kimura

[11] Patent Number: 5,270,989
[45] Date of Patent: Dec. 14, 1993

[54] DISK PLAYER

[75] Inventor: Atsushi Kimura, Saitama, Japan

[73] Assignee: Pioneer Electronic Corporation, Tokyo, Japan

[21] Appl. No.: 865,496

[22] Filed: Apr. 9, 1992

[30] Foreign Application Priority Data

May 30, 1991 [JP] Japan .................. 3-127872

[51] Int. Cl.$^5$ ............................. G11B 17/22
[52] U.S. Cl. .................................... 369/37
[58] Field of Search .................. 369/37, 36, 75.2, 191, 369/192, 194, 34; 360/98.04, 98.06

[56] References Cited

U.S. PATENT DOCUMENTS 5,214,628  5/1993  Langman et al. .............. 369/37

FOREIGN PATENT DOCUMENTS 04-56464   11/1991  European Pat. Off. ......... 369/191
63-153345  10/1988  Japan.
04-271055   9/1992  Japan.
WO87/07423 12/1987  World Int. Prop. O.

Primary Examiner—Stuart S. Levy
Assistant Examiner—Paul Ditmyer
Attorney, Agent, or Firm—Finnegan, Henderson, Farabow, Garrett & Dunner

[57] ABSTRACT

A disk player capable of playing one of a plurality of disks arranged on a tray, comprises a housing, and a tray having a center and a plurality of disk rests aligned radially around the center of the tray, the tray movable between a disk loading position outside of the housing and an operating position located inside the housing the center of the tray corresponding to a disk playing position when the tray is in the operating position. A disk selecting device includes a rotatable-arm member rotatable about the disk playing position and a disk holder slidably attached to the rotatable-arm member, the disk holder reciprocatively movable between the disk playing position and one of the plurality of disk rests for moving a selected disk to be played from its associated disk rest to the disk playing position. A disk detecting device is attached to the disk holder and detects whether the selected disk is attached to the disk holder. The tray is ejected from inside the disk player housing when the disk detecting device determines that the selected disk has become detached from the disk holder during movement of the selected disk from the disk rest to the disk playing position.

12 Claims, 7 Drawing Sheets and one LD with those disks accommodated therein.

DISK PLAYER

BACKGROUND OF THE INVENTION

1. Field of the Invention

The present invention relates to a disk player for playing optical disks such as compact disks (CDs) and laser vision disks (LDs), and more particularly to a disk player suitable for selectively playing a plurality of CDs and one LD with those disks accommodated therein.

2. Discussion of the Related Art

In order to avoid problems involved in repeating the operation of replacing disks one at a time in playing CDs, the so-called compatible disk player has, in recent years, been proposed in which a plurality of CDs are arranged in one plane on a tray so as to play the CDs continuously, and are also arranged to permit playing of a laser disk (LD) (e.g. Japanese Utility Model Unexamined Publication No. Sho. 63-153345). This disk player is arranged such that a plurality of CDs and one LD are placed on a tray provided in a player body. In addition, a CD motor for rotatively driving the CD and an LD motor for rotatively driving the LD are disposed in the player body. In addition, when the LD on the tray is to be played, the LD is driven by the LD motor, and when a desired CD is to be played, the tray is rotated to locate the CD in position with respect to the CD motor, and that CD is rotatively driven by the CD motor.

With the above-described conventional compatible disk player, however, precision and expensive motors are required each for driving the CD and for driving the LD, respectively. In addition, the tray must be rotated to permit a desired CD to be moved to the position of the CD motor.

Furthermore, when the LD is to be loaded on the LD motor, it is necessary to incline the CD motor to a predetermined angle and ensure that the CD motor will not come into contact with the LD. For that reason, the structure of the disk player becomes complicated. Since the LD cannot be played with the CD placed on the tray, it is necessary to remove the CD before playing the LD. Hence, the advantage that a plurality of CDs can be placed appears conversely as a drawback in playing the LD.

Accordingly, to overcome the aforementioned drawback, a disk player has been proposed which does not require the rotation of the tray, makes it possible to jointly use one rotatively driving motor for both the playing operation of the CD and the playing operation of the LD, and permits playing of the LD with a plurality of CDs placed on the tray (Japanese Patent Application No. Hei. 3-30755).

In accordance with this disk player, a disk-detecting means is provided in which the presence or absence of the CD or LD at a placing position on the tray is confirmed prior to the playing operation of the CD or LD, and the CD or LD is automatically selected. In the CD playing mode, the disk-detecting means is operated when a carriage (disk-holding means) has reached the placing position on the tray, so as to detect the presence or absence of the CD. After the presence of the CD is confirmed, the carriage holds the CD, returns to the disk-playing position, and sets the CD at the playing position.

However, in the case of the disk player disclosed in the specification of the aforementioned Japanese Patent Application No. Hei. 3-30755, the detection operation is conducted with respect to the presence or absence of the CD when the carriage is located at the disk-placing position (i.e., the disk rests) on the tray, but detection is not conducted with respect to the process of subsequent operations, i.e., transporting the disk by the carriage from the disk-placing position to the disk-playing position. Although the probability of the disk being dislocated or slipping off the carriage during transport of the disk is generally low, in light of the requirement of a fail-safe operation, it is undesirable in the operation of the disk player to start the playing operation in such a state.

SUMMARY OF THE INVENTION

The present invention has been made in view of the above circumstances and has as an object to provide a disk player which is capable of preventing the start of the disk-playing operation in the event that an abnormality in the transport of a disk or the like has occurred.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the disk player of this invention comprises a housing, a tray having a center and a plurality of disk rests aligned radially around the center of the tray, the tray movable between a disk loading position outside of the housing and an operating position located inside the housing the center of the tray corresponding to a disk playing position when the tray is in the operating position, a rotatable-arm member rotatable about the disk playing position, disk holding means slidably attached to the rotatable-arm member, the disk holding means reciprocatively movable between the disk playing position and a selected one of the plurality of disk rests for moving a selected disk to be played from the selected disk rest to the disk playing position, disk detecting means attached to the disk holding means, the disk detecting means detecting whether the selected disk is attached to the disk holding means, and ejecting means for moving the tray to the disk loading position outside of the housing when the disk detecting means determines that the selected disk has become detached from the disk holding means during the movement of the selected disk from the disk rest to the disk playing position.

In accordance with another aspect of the invention, there is provided a disk player comprising a housing, a tray having a center and a plurality of disk rests aligned radially around the center of the tray, rotatable-arm member rotatable about the disk playing position, disk holding means slidably attached to the rotatable-arm member, disk detecting means attached to the disk holding means, the disk detecting means detecting whether the selected disk is attached to the disk holding means, and ejecting means for moving the tray to the disk loading position outside of the housing when the disk detecting means detects that the selected disk has become detached from the disk holding means upon completion of a disk transporting operation.

In accordance with the first aspect of the invention, in a case where disks are respectively placed in each or some of a plurality of disk rests in the tray, the diskholding means is moved by the rotatable-arm member from the disk rest to a designated disk rest. Then, after holding the disk on the disk rest, the disk-holding means moves to return to the disk-playing position. If the disk slips off the disk-holding means during this movement, the disk-detecting means outputs a detection signal. The detection of the state of slipping off of the disk from the disk-holding means by means of this disk-detecting means is effected by detecting a change in the relative distance between the disk and the disk-holding means. That is, in the disk-holding state, the disk-holding means and the disk maintain a mutually close distance, but in the state of slipping off of the disk, the relative distance increases. Accordingly, by detecting the fact that the distance between the disk-holding means and the disk has widened by more than a fixed amount, it is possible to detect the slipping off or dislocation of the disk from the disk-holding means. When the detection signal is thus outputted, the ejecting means causes the tray to project from within to outside the housing. Through this ejection operation, the user is capable of ascertaining the failure in holding the disk, so that it becomes possible to return the dislocated disk to its proper position and repeat the operation.

Additionally, in accordance with the second aspect of the invention, in the event that a failure in holding the disk by the disk-holding means or a failure in transport has occurred, the disk-detecting means detects the presence or absence of the disk upon completion of the transfer of the disk, i.e., at the diskplaying position. The basic principle of this detection is the same as that of the disk-detecting means in accordance with the first aspect of the invention. When the detection signal is thus outputted, the ejecting means causes the tray itself to project from within to outside the housing. Through this ejection operation, the user can return the disk to its proper position and prevent an abnormal operation from occurring.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

DESCRIPTION OF THE PREFERRED EMBODIMENTS

Referring now to the accompanying drawings, a description will be given of the preferred embodiments of the present invention.

Figure 1:
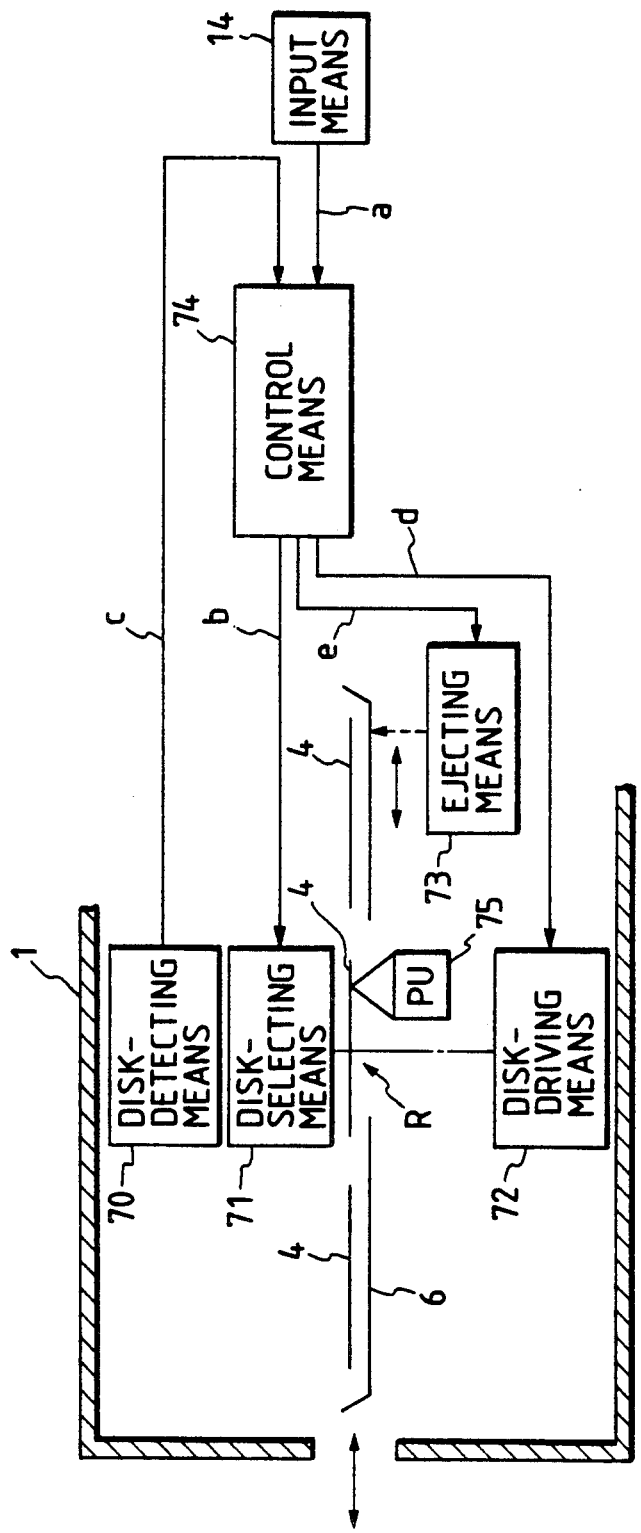
FIG. 1 is a conceptual diagram of a disk player in accordance with the present invention.

FIG. 1 shows an outline of the disk player in accordance with the present invention. A tray 6 which permits a plurality of CDs 4 to be placed thereon is disposed in a player housing 1 in such a manner as to be capable of being inserted into or withdrawn from the player housing 1. A CD 4 located at a disk-playing position R is rotatively driven by a disk-driving means 72, and the CD 4 is optically read by a pickup device 75. One of the plurality of CDs 4 on the tray 6 is selected by a disk-selecting means 71, and is always transported to the disk-playing position R so as to be played. A disk-detecting means 70 detects the presence or absence of the CD 4 in a disk rest in the tray 6 and the presence or absence of the CD 4 in the course of transport thereof from the disk rest to the disk-playing position R (i.e., slipping off or a failure in holding), or the presence or absence of the CD 4 at the disk-playing position R at the time of completion of transport (i.e., slipping off or a failure in holding). If any of these transport abnormalities is detected, all the operations concerning playing disks are stopped, and an ejecting means 73 forcibly causes the tray 6 to project outside the player housing 1. These series of operations are controlled by a control means 74 which controls the aforementioned elements. Input means 14 includes a group of operation switches used to enter operating commands necessary for playing, e.g., a disk selection command and other commands.

Figure 2:
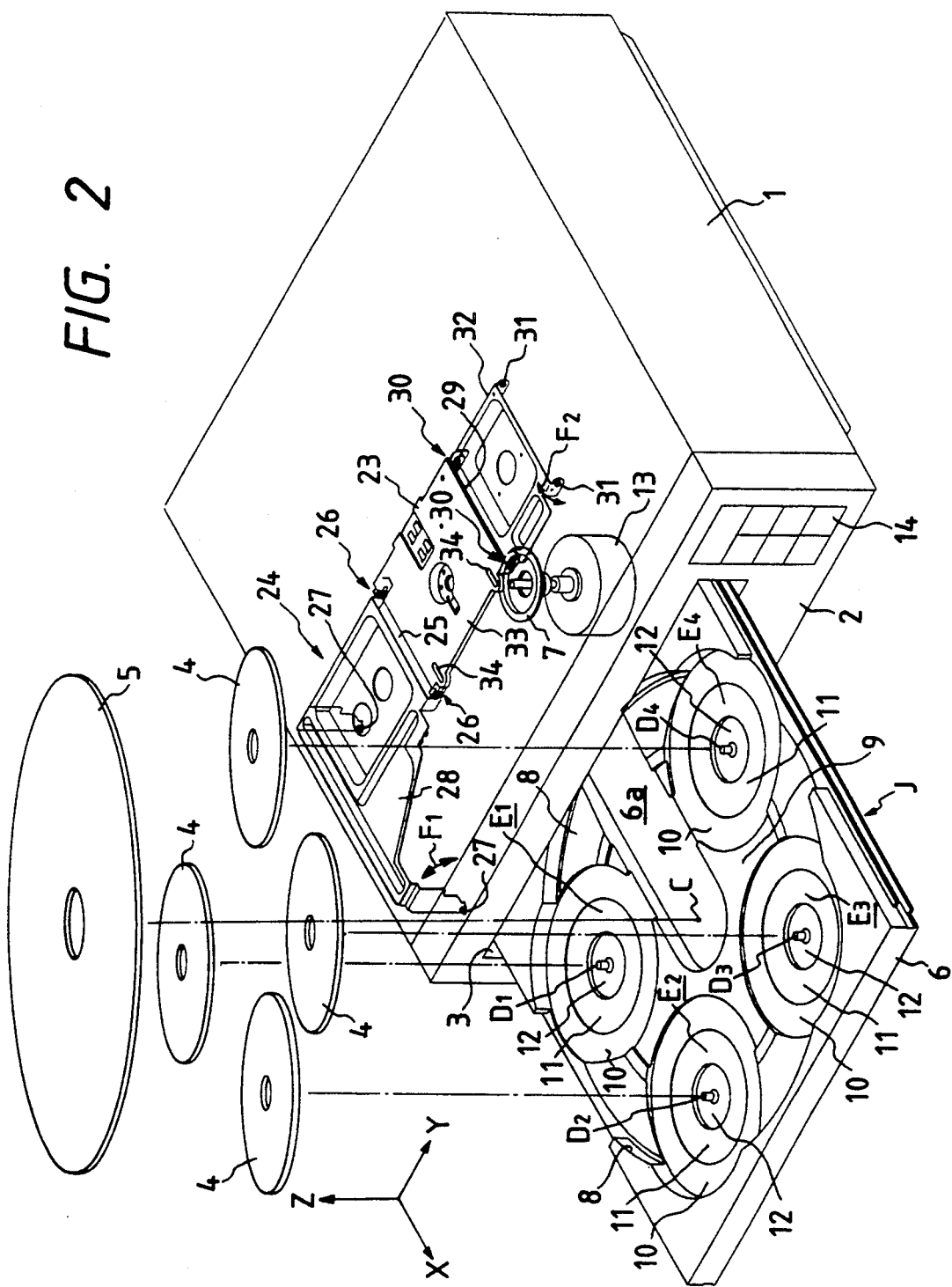
FIG. 2 is a perspective view illustrating an overall structure of the disk player and the state of ejection of a tray.
Figure 3:
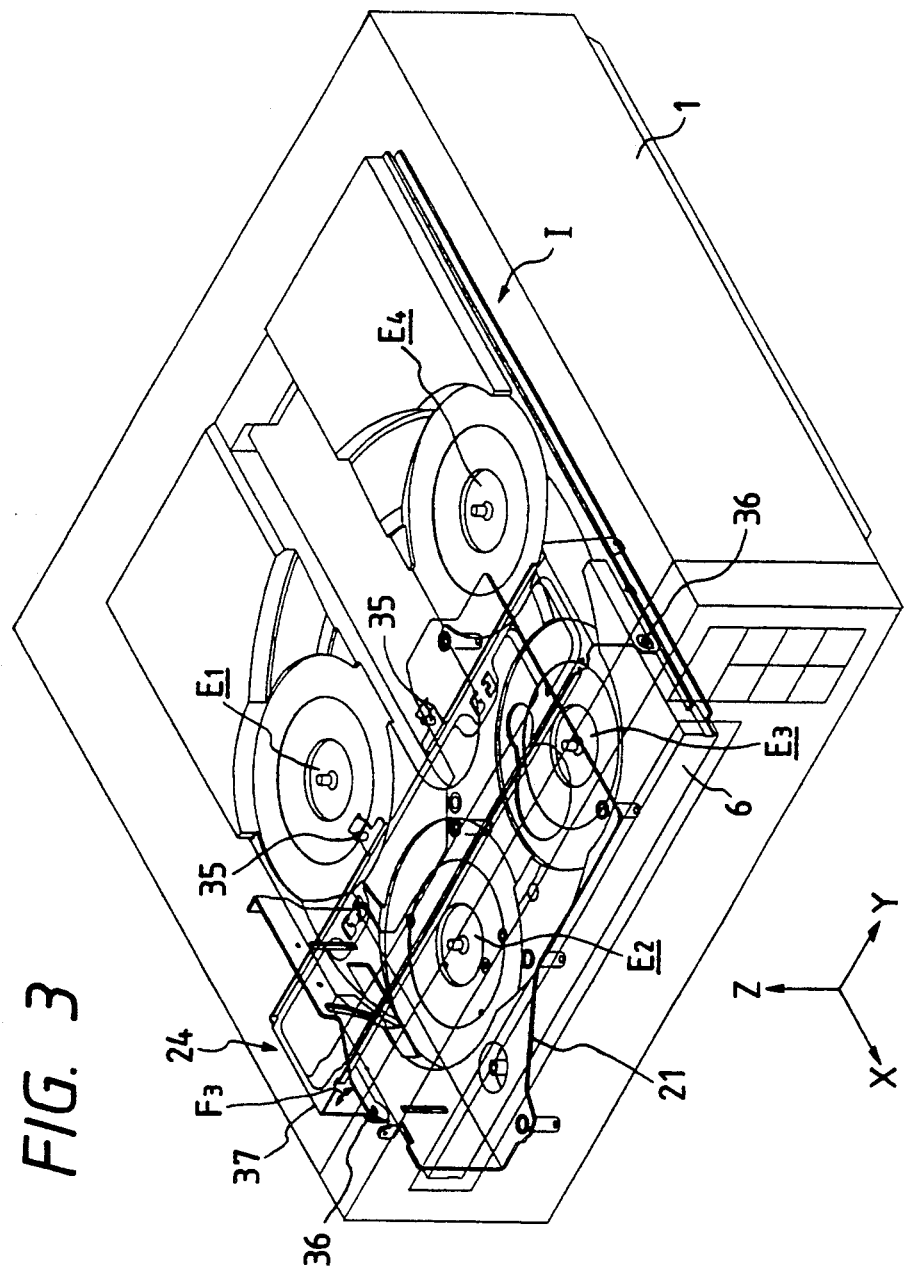
FIG. 3 is a perspective view illustrating the state of the tray being accommodated in the disk player housing.
Figure 4:
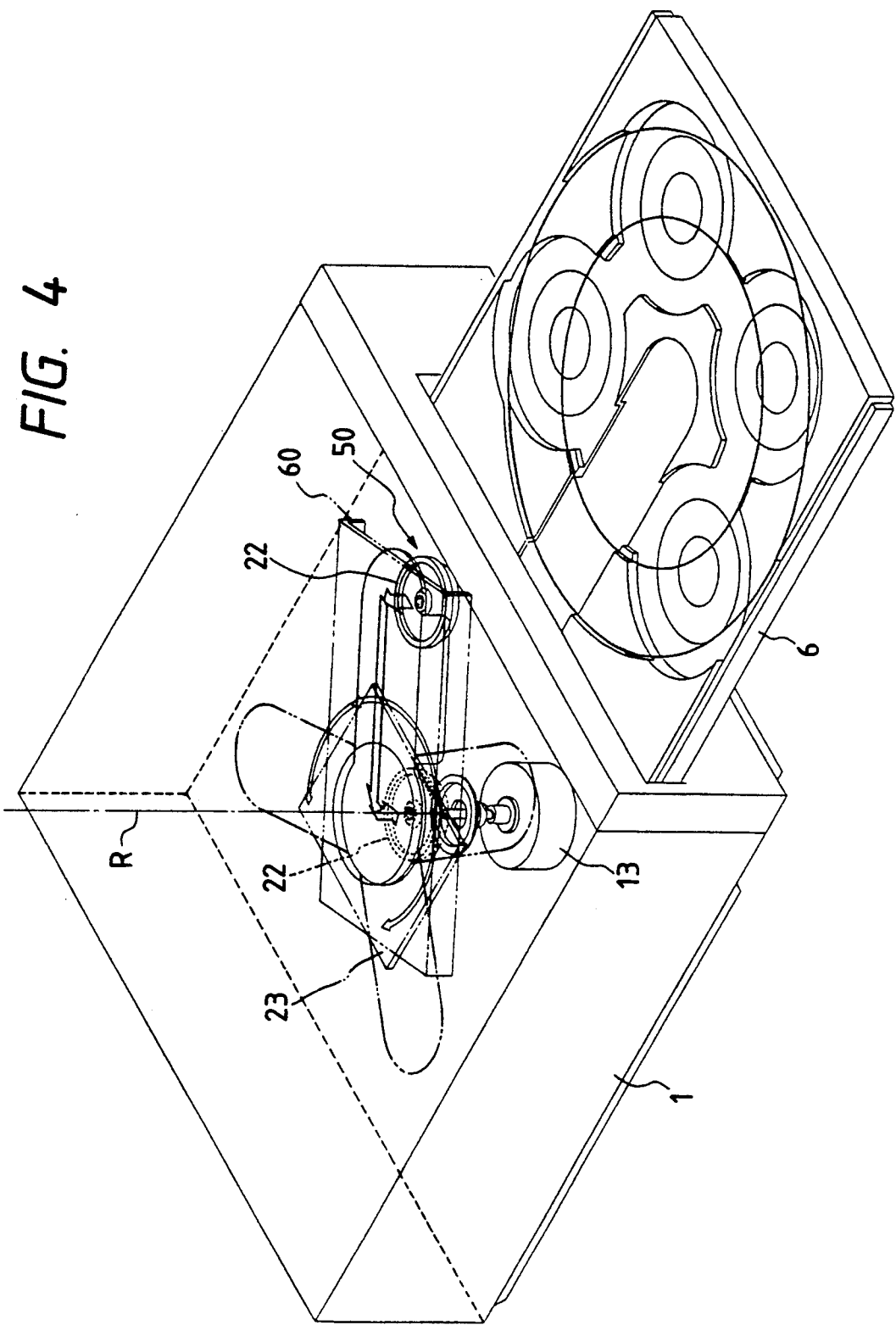
FIG. 4 is a perspective view illustrating the structures of a rotatable arm means and a disk-holding means.

FIGS. 2 to 4 illustrate an overall structure of the disk player in accordance with this embodiment. As shown in FIGS. 2 and 3, a rectangular disk-supplying port 3 extending horizontally is formed in a front panel 2 of the player housing 1. The arrangement provided is such that the tray 6, on which the four CDs and one large-diameter LD 5 to be played are detachably placed, can move back and forth through the disk-supplying port 3 and project to an ejected position J (FIG. 2) outside the player housing 1, or can be accommodated in an accommodating position I inside the housing. It should be noted that, in the drawing, arrows X, Y, and Z denote the forward direction, rightward, and upward directions, respectively. The CD 4 has a diameter of approximately 8 cm or 12 cm, while the LD 5 has a diameter of approximately 20 cm or 30 cm, but the respective diameters are not confined to the dimensions just mentioned.

The tray 6 is disposed in a plane substantially parallel with a disk-carrying plate of a turntable 7 within the player housing 1. This tray 6 is arranged such that the CDs 4 are detachably placed in a plurality of (in this embodiment, four) disk rests $E_1$-$E_4$ where central positions $D_1$, $D_2$, $D_3$, $D_4$ are aligned radially with a central position C as a center, respectively. It should be noted that although the arrangement provided is such that the four CDs are capable of being placed in the disk rests $E_1$-$E_4$, an arrangement may be alternatively provided such that five or more CDs are capable of being placed therein. In addition, a large-diameter circular recess 8 for the large-diameter LD and a small-diameter circular recess 9 for the small-diameter LD both serving as a second guide portion are respectively formed in the tray 6 concentrically with the central position C so as to detachably load the LD 5 in the central position C. It should be noted that there may be a case where the CD is placed in this second guide portion instead of the LD. In addition, a first guide portion having a stepped portion with respect to the aforementioned second guide portion is formed in the tray 6 so as to detachably load the CD 4 in each disk rest $E_1$-$E_4$. This first guide portion is arranged such that the CD 4 is placed in each of the disk rests $E_1$-$E_4$ by being located at a position lower than the LD 5. That is, this first guide portion has a large-diameter circular recess 10 for the large CD, a small-diameter circular recess 11 for the small-diameter CD, and a central recess 12 for allowing CD-holding claws (CD holder) 79 to be inserted therein. These recesses are formed in each of the disk rests $E_1$-$E_4$ in of steps concentrically with each of the centers $D_1$-$D_4$ of the rests.

It should be noted that a reference character 6a in FIG. 2 denotes a notched portion formed in the tray 6, and this notched portion 6a is so designed that the tray 6 will not come into contact with the turntable 7 and a spindle motor 13 for rotatively driving the turntable 7. In addition, a group of switches 14 for operating the disk player are provided on the front panel 2.

FIG. 3 shows a state in which the tray 6 is accommodated in the player housing 1, and also shows a tray-supporting structure for supporting the tray 6. This tray 6 is supported by a loading base 21 secured in the player housing 1, and is moved back and forth by an unillustrated drive mechanism. By means of the input means or group of switches 14, this movement of the tray 6 can be controlled so as to move to either the ejected position J in which the tray 6 projects to a forward-side position (X-direction side), as shown in FIG. 2, or the accommodating position I in which the tray 6 is accommodated in the player housing 1 and the CDs 4 and the LD 5 can be played, as shown in FIG. 3.

A plate-like arm base 23 for supporting a disk clamper portion 22 (FIG. 4) for clamping the disk (CD 4 or LD 5) is disposed parallel with the tray 6. This arm base portion 23 is capable of being raised or lowered vertically by means of an armbase-portion lifting mechanism 24. The arm-base-portion lifting mechanism 24 has three clamper arms, a left clamper arm 28, a right clamper arm 32, and a front clamper arm 37. The left clamper arm 28 swingably engages a left-side surface 25 of the arm base portion 23 via a pair of left-side engaging portions 26, and swingably (arrow $F_1$) engages the loading base 21 via a pair of shaft portions 27. The right clamper arm 32 swingably engages a right-side surface 29 of the arm base portion 23 via a pair of right-side engaging portions 30, and swingably (arrow $F_2$) engages the loading base 21 via a pair of shaft portions 31. The front clamper arm 37 engages the arm base portion 23 via a pair of projections 35 which are relatively movably fitted into a pair of slits formed in a front portion 33 of the arm base portion 23, respectively. The front clamper arm 37 also swingably engages the loading base 21 via a pair of engaging portions 36. It should be noted that the pair of left-side engaging portions 26 for the arm base portion 23 and the left clamper arm 28 are also slidable transversely (in the Y-direction and a direction opposite thereto), as a pin provided on the left clamper arm 28 is fitted in a slit penetratingly formed in the transverse direction in a left-side portion of the arm base portion 23.

Accordingly, in order to raise the arm base portion 23 by means of the arm-base-portion lifting mechanism 24, it suffices if the left clamper arm 28 is swung by an unillustrated driving portion. That is, in a case where the arm base portion 23 located at a raised position, as shown in FIGS. 2 and 3, is lowered, if the left clamper arm 28 is swung clockwise (as viewed from the front) about the shaft portion 27 by the aforementioned driving portion, the aforementioned pin of the left-side engaging portion 26 rotates while sliding in the slit formed in the arm base portion 23, thereby pushing the arm base portion 23 downward. As a result, the projections 35 of the clamper arm 37, while sliding in the slits 34 in the arm base portion 23, are swung clockwise (as viewed from the right-hand side) about the engaging portion 36. Meanwhile, the right clamper arm 32 is also swung counterclockwise about the shaft portion 31. As a result, the arm base portion 23 is lowered while maintaining a parallel state with respect to the tray 6.

It should be noted that the pickup device 75 (FIG. 1) for picking up the disk signals recorded in the CD 4 or the LD 5 set in the playing position so as to play the same is provided in the player housing 1. When a command signal is sent to this pickup device 75 by operating one of the group of switches of the input means 14 on the disk player, this pickup device 75 moves horizontally and picks up the signals from the disk.

FIG. 4 illustrates a schematic configuration and operation of the disk player in accordance with this embodiment. As shown in the drawing, the disk player has a carriage 50 serving as a diskholding means for detachably holding the CD 4 (FIG. 2) serving as a first disk on the tray 1, as well as a rotatable-arm member 60 which is adapted to rotate about the disk-playing position R and to support the carriage 50 reciprocatively between the diskplaying position R and any of the positions of the disk rests $E_1$-$E_4$ of the tray 6 when the tray 6 is accommodated in the player housing 1. Furthermore, at the time of playing the LD 5 (FIG. 2) on the tray 6, the disk player plays the LD 5 at the disk-playing position R. It should be noted that the disk-playing position R is common with the central position of the spindle motor 13 and that of the turntable 7.

As shown in FIG. 4, the rotatable-arm member 60 constituting the disk-selecting means 71 (FIG. 1) is disposed adjacent to the underside of the arm base portion 23 in such manner as to be rotatable 360° about the center of the disk-playing position R. This rotatable-arm member 60 is provided with the carriage (diskholding means) 50 having the disk clamper portion 22 in such a manner as to be reciprocable in the longitudinal direction of the rotatable-arm member 60. The rotatable-arm member 60 has a substantially U-shaped cross section, and the carriage 50 is inserted into opposing side pieces thereof so as to be reciprocable. At the time of movement of the CD 4, the rotatable arm member 60 rotates toward a designated one of the disk rests, and the carriage 50 then slides to reach the disk rest. Subsequently, the disk clamper portion 22 is lowered to hold the CD 4, and is then raised again to return to the position of the disk-playing position R.

The present invention prevents the occurrence of problems based on the slipping off of the CD 4 from the time when the CD 4 is held by means of the rotatable-arm member 60, the carriage 50, and the disk clamper portion 22 until the time when the CD returns to the disk-playing position R, or problems based on the failure of the disk clamper portion 22 to hold the CD 4 in the disk rest.

Figure 5A:
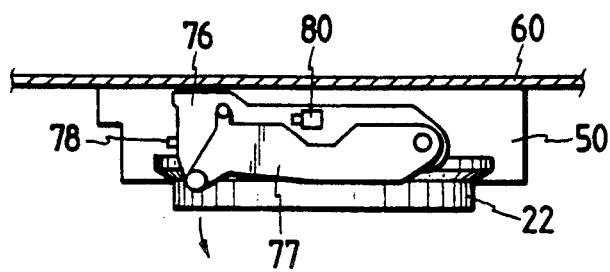
FIGS. 5(a) to 5(d) are partially enlarged views illustrating the arrangement and operation of a disk-detecting means.
Figure 5B:
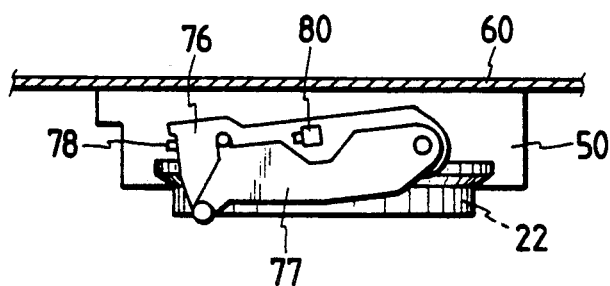
Figure 5C:
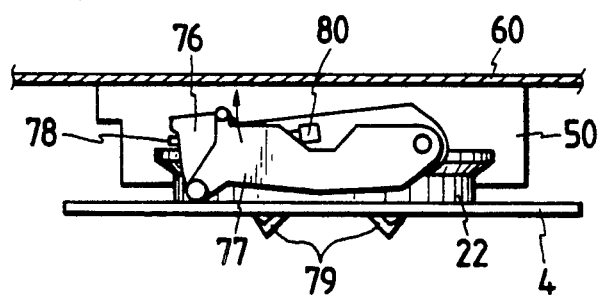
Figure 5D:
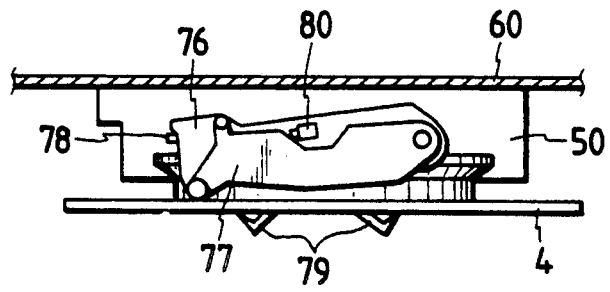

An example of the configuration of the disk-detecting means 70 is shown in FIGS. 5(a) to 5(d). As shown in FIG. 5(a), a first lever 76 and a second lever 77 which are vertically rotatable are coaxially secured to a side portion of the carriage 50 in a superimposed manner in such a manner as to be rotatable. The first lever 76 and the second lever 77 are so arranged that their open-end sides are lowered owing to their own weight. The first lever 76, however, has its lowered position restricted by a retaining projection 78 which is provided on the carriage 50. The second lever 77 is adapted to rotate further below the first lever 76. At the time of detection of the disk, when the carriage 50 reaches any of the disk rests $E_1$-$E_4$ of the tray 6 clamper portion 22 is lowered and clamps the CD 4, the first lever 76 and the second lever 77 are lowered simultaneously (FIG. 5(b)). At this juncture, the second lever 77 does not abut against a detecting element of a detection switch 80, so that the detection switch 80 does not output a detection signal. Then, when the CD 4 is present in the disk rest of the tray 6 (FIG. 5(c)), the second lever 77 is pushed upward, and abuts against the detecting element of the detection switch 80. At this time, the detection switch 80 outputs a detection signal. Then, the CD 4 is held by the holding claws 79, and the carriage 50 slides along the rotatable-arm member 60 and returns to the disk-playing position R. During this transport, when the CD 4 is disengaged from the holding claws 79 and slips off, the second lever 77 is lowered and ceases to abut against the detection switch 80, so that the detection switch 80 stops outputting the detection signal. In this manner, the second lever 77 moves vertically in response to a change in the relative distance between the carriage 50 and the CD 4, and that change can be detected as a change in the detection signal of the detection switch 80. Hence, it is possible to detect not only the presence or absence of the CD 4 on the tray 6 but also the presence or absence of the CD 4 in the course of transport thereof up to the disk-playing position R. This basic principle of this detection similarly holds when the CD 4 has reached the disk-playing position R, i.e., upon completion of the transport. By determining the presence or absence of an output signal of the detection switch 80 at the disk-playing position R, it is possible to detect the presence or absence of the CD 4 at the disk-playing position R. FIG. 5(d) illustrates the state in which the CD 4 has been transported to the disk-playing position R, and this state is similar to that of FIG. 5(c).

Figure 6:
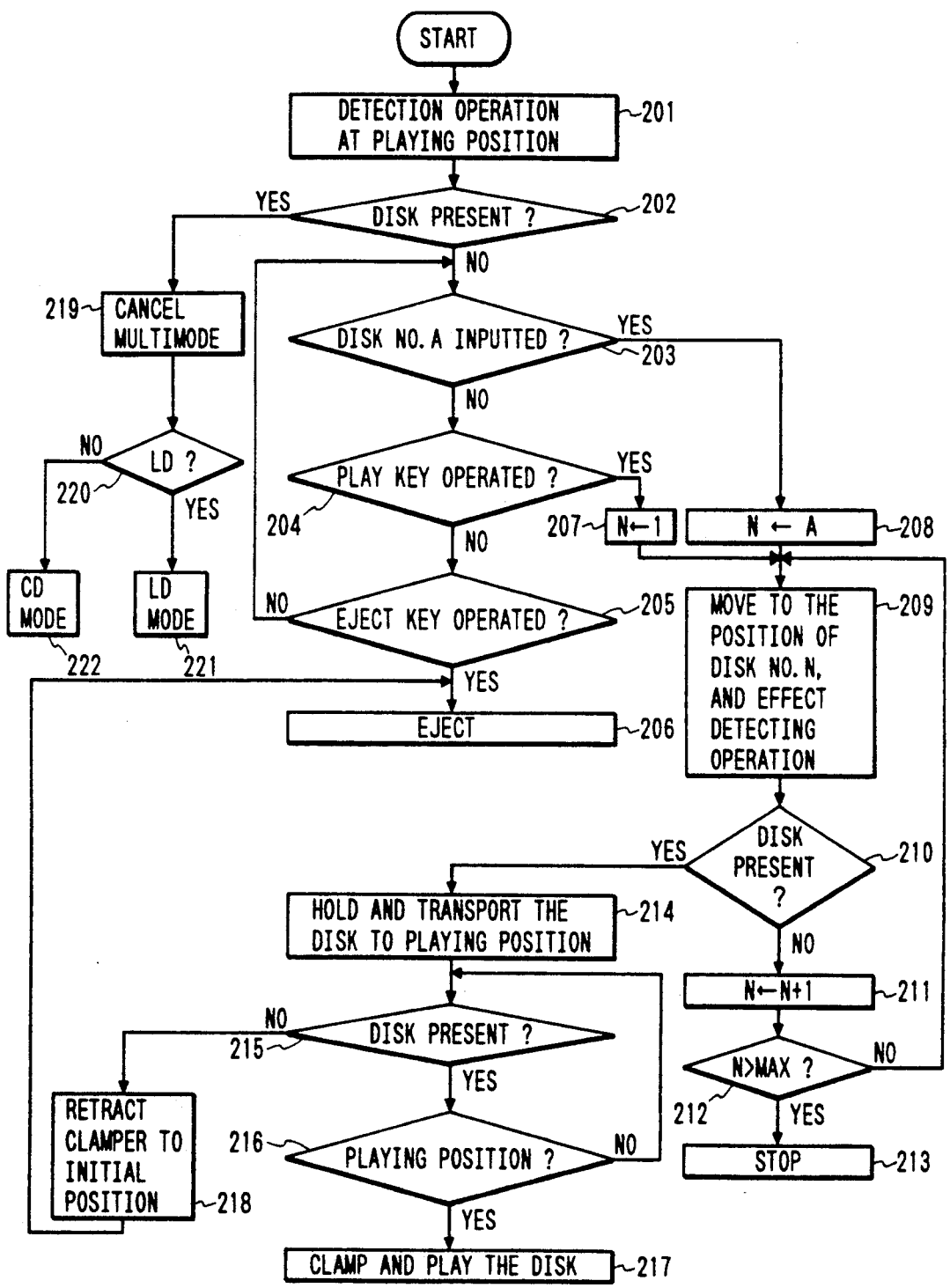
FIG. 6 is a flowchart illustrating the operation of a first embodiment of the present invention.

On the basis of the above-described structure, a description will be given of a first embodiment of the present invention. FIG. 6 shows a flowchart in accordance with the first embodiment. It should be noted that this algorithm is stored in a ROM (not shown) included in the control means 74 shown in FIG. 1, and is executed by a built-in CPU in accordance with data stored therein.

In this first embodiment, the tray 6 is forcibly ejected in the event that it has been detected that the CD 4 has slipped off from any one of the disk rests $E_1$-$E_4$ in the tray 6 in the course of transport of the CD 4 to the disk-playing position R, or that a failure in holding the CD 4 has occurred in any of the rests $E_1$-$E_4$ in the tray 6. Hereafter, a description will be given of the operation with reference to FIG. 6.

First, the disk-detecting means 70 performs the operation of detecting the CD 4 or the LD 5 at the disk-playing position R (Step 201). As a result, in a case where the disk is present at the disk-playing position R (YES) in Step 202, the operation proceeds to Step 219 to cancel a multimode. The multimode refers to a function of a compatible disk player, whereby a plurality of CDs 4 or one LD 5 are selectively played. Upon cancellation of the multimode, the disk player plays only the disk located at the disk-playing position R. Accordingly, in Step 220, a determination is made as to whether or not the disk is the LD 5, and either playing mode of the CD mode or the LD mode is set in response to the result of that determination (Steps 221 and 222).

Meanwhile, if it is determined in Step 202 that the disk is not present at the disk-playing position R (NO), the loop comprising Steps 203→204→205→203 is repeated, and the operation waits for the entry of an operation command. If it is determined in Step 203 that a disk number A has been entered (YES), the operation proceeds to Step 208 to set A as the disk number N to be played (to be selected). Then, in Step 209, the carriage 50 and the rotatable-arm member 60 are actuated, and the carriage 50 is moved to the position of the disk number N. Then, the disk-detecting means 70 detects whether or not the disk is present at the position of the disk number N through the detecting operation shown in FIGS. 5(a) to 5(d) (Step 210). If the disk is present, the operation proceeds to Step 214, and the carriage 50 and the rotatable-arm member 60 hold the disk to transport it to the disk-playing position R. During the course of this transport, the disk-detecting means 70 detects the presence or absence of the disk (Step 215). If the disk is not present (NO), the disk clamper portion 22 is retracted to its initial position (Step 218), and the tray 6 is then ejected (Step 206). Through this ejecting operation, the user corrects the improperly held or slipped-off CD 4 in a proper placing position, and again commands the playing operation. Thus, the ejection in the event of a failure in holding the disk or the slipping off thereof leads to a fail-safe operation in operating the disk player, and makes it possible to prevent abnormal operation.

It should be noted that if the presence of the disk was not confirmed in Step 210, the loop comprising Steps 211→212→209 is repeated until the total number (MAX) of the disks is reached by consecutively incrementing the disk number N.

In addition, if the presence of the disk was confirmed in Step 215, the playing operation of a selected disk is executed through the processing of Steps 216 and 217.

Figure 7:
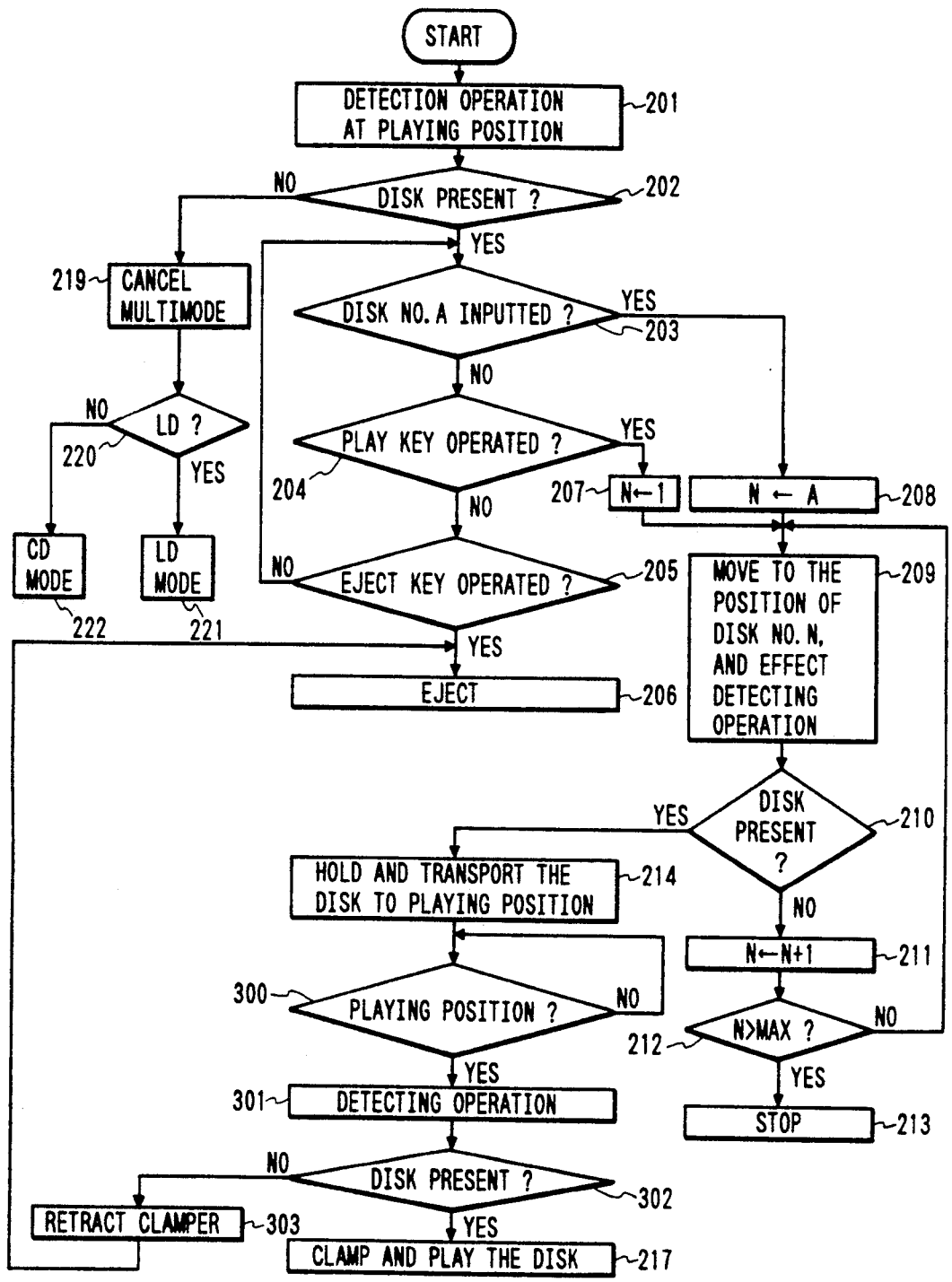
FIG. 7 is a flowchart illustrating the operation of a second embodiment of the present invention.

FIG. 7 illustrates a flowchart in accordance with the second embodiment. The algorithm shown in this flowchart is also executed by the control means 74 shown in FIG. 1, in the same way as in the first embodiment.

This second embodiment is characterized in that the presence or absence of the CD 4 is confirmed at a point in time when the carriage 50 has transported the CD 4 to the disk-playing position R, and the disk is either played or ejected in accordance with the presence or absence thereof. It should be noted that, in FIG. 7, portions similar to those of FIG. 6 are denoted by the same reference numerals, and a description thereof will be omitted.

What differs in FIG. 7 from FIG. 6 is a loop comprising Steps 300→301→302→303→206. That is, after it is confirmed in Step 214 that the CD 4 has been transported toward the diskplaying position R, and after it has been confirmed in Step 300 that the disk has reached the disk-playing position R, the presence or absence of the disk is detected by the disk-detecting means 70 in Step 301. Then, if it is determined in Step 302 that the disk is not present (NO), the ejection of the tray 6 is carried out in Step 206 through Step 303. Since the fact that the CD 4 is not detected at the disk-playing position means that the disk has slipped off in the course of transport, if the playing operation is started, an abnormal operation will be induced. In this embodiment, however, the operations are stopped and the disk is ejected, so safety can be ensured. However, unlike the first embodiment, the detecting and ejecting operations are not performed in the course of transport. This is because the carriage 50 and the rotatable-arm member 60 are operating, so that it is undesirable to commence other operations during the operation of the internal mechanisms. Accordingly, it can be said that the ejection upon completion of the operation of the carriage 50 and the rotatable-arm member 60 is desirable in light of the fail-safe operation of the machine.

As described above, in accordance with one aspect of the invention, the presence or absence of the disk is detected in the course of transport of the disk from the disk rest to the disk-playing position, and the tray is ejected if the disk is absent. Accordingly, it is possible to prevent an ensuing playing operation from being performed in a state in which the failure in holding the disk or the slipping off thereof occurs without being remedied. At the same time, it is possible to alert the user, thereby making it possible to effect a highly safe operation.

In addition, in accordance with another aspect of the invention, the presence or absence of the disk is detected at the disk-playing position upon completion of the transporting operation of the disk, and if the disk is absent, the tray is ejected. Accordingly, since the disk is ejected upon completion of a series of operations without causing the operation to be interrupted by another operation during the transporting operation, it is possible to improve safety further.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

We claim:

1. A disk player capable of playing one of a plurality of disks arranged on a tray, comprising:
   a housing;
   a tray having a center and a plurality of disk rests aligned radially around said center of said tray, said tray movable between a disk loading position outside of said housing and an operating position located inside said housing, said center of said tray corresponding to a disk playing position when said tray is in said operating position;
   a rotatable-arm member rotatable about said disk playing position;
   disk holding means slidably attached to said rotatable-arm member, said disk holding means reciprocatively movable between said disk playing position and one of said plurality of disk rests for moving a selected disk to be played from its associated disk rest to said disk playing position;
   disk detecting means attached to said disk holding means, said disk detecting means detecting whether said selected disk is being held by said disk holding means; and
   ejecting means for moving said tray to said disk loading position outside of said housing when said disk detecting means determines that said selected disk has become detached from said disk holding means after removal of said selected disk from said disk rest.

2. The multiple disk player of claim 1, further comprising disk driving means for rotatably driving said selected disk at said disk playing position.

3. The multiple disk player of claim 1, wherein said rotatable arm member is rotatably attached to an arm base portion secured to said housing, said rotatable arm member rotatable 360° about the center of said disk playing position.

4. The multiple disk player of claim 1, wherein said disk holding means includes a carriage attached to said rotatable arm member, said carriage having a disk clamper portion reciprocatively movable in the longitudinal direction of said rotatable arm member.

5. The disk player of claim 1, wherein said disk detecting means detects whether said selected disk is being held by said disk holding means based on a relative distance between said selected disk and said disk holding means.

6. The disk player of claim 5, wherein said disk detecting means includes a signal generating means for generating a signal to activate said ejecting means when the relative distance between said selected disk and said disk holding means becomes greater than a predetermined distance.

7. A disk player capable of playing one of a plurality of disks arranged on a tray, comprising:
   a housing;
   a tray having a center and a plurality of disk rests aligned radially around said center of said tray, said tray movable between a disk loading position outside of said housing and an operating position located inside said housing said center of said tray corresponding to a disk playing position when said tray is in said operating position;
   a rotatable-arm member rotatable about said disk playing position;
   disk holding means slidably attached to said rotatable-arm member, said disk holding means reciprocatively movable between said disk playing position and one of said plurality of disk rests for moving a selected disk to be played from its associated disk rest to said disk playing position;
   disk detecting means attached to said disk holding means, said disk detecting mean detecting whether said selected disk is being held by said disk holding means; and
   ejecting means for moving said tray to said disk loading position outside of said housing when said disk detecting means detects that said selected disk has become detached from said disk holding means upon completion of a disk transporting operation.

8. The multiple disk player of claim 7, further comprising disk driving means for rotatably driving said selected disk at said disk playing position.

9. The multiple disk player of claim 7, wherein said rotatable arm member is rotatably attached to an arm base portion secured to said housing, said rotatable arm means rotatable 360° about the center of said disk playing position.

10. The multiple disk player of claim 7, wherein said disk holding means includes a carriage attached to said rotatable arm member, said carriage having a disk clamper portion reciprocatively movable in the longitudinal direction of said rotatable arm member.

11. The disk player of claim 7, wherein said disk detecting means detects whether said selected disk is being held by said disk holding means based on a relative distance between said selected disk and said disk holding means.

12. The disk player of claim 11, wherein said disk detecting means includes a signal generating means for generating a signal to activate said ejecting means when the relative distance between said selected disk and said disk holding means becomes greater than a predetermined distance.

* * * * *

UNITED STATES PATENT AND TRADEMARK OFFICE
CERTIFICATE OF CORRECTION

PATENT NO. : 5,270,989
DATED : December 14, 1993
INVENTOR(S) : Atsushi KIMURA

It is certified that error appears in the above-indentified patent and that said Letters Patent is hereby corrected as shown below:

Column 10, claim 7, line 50, change "mean" should read --means--.

Signed and Sealed this

Sixteenth Day of August, 1994

Attest:

BRUCE LEHMAN

*Attesting Officer*     *Commissioner of Patents and Trademarks*